US009677761B2

(12) United States Patent
Ranalli et al.

(10) Patent No.: US 9,677,761 B2
(45) Date of Patent: Jun. 13, 2017

(54) AIR-GAS MIXER DEVICE FOR PREMIX BURNER EQUIPMENT

(71) Applicant: SIT S.p.A., Padua (IT)

(72) Inventors: Antonio Ranalli, Montefano (IT); Massimo Lenti, Savigliano (IT)

(73) Assignee: SIT S.P.A., Padua (IT)

( * ) Notice: Subject to any disclaimer, the term of this patent is extended or adjusted under 35 U.S.C. 154(b) by 0 days.

(21) Appl. No.: 14/902,159

(22) PCT Filed: Jun. 17, 2014

(86) PCT No.: PCT/IB2014/062281
§ 371 (c)(1),
(2) Date: Dec. 30, 2015

(87) PCT Pub. No.: WO2015/001438
PCT Pub. Date: Jan. 8, 2015

(65) Prior Publication Data
US 2016/0161114 A1 Jun. 9, 2016

(30) Foreign Application Priority Data
Jul. 5, 2013 (IT) .............................. PD2013A0189

(51) Int. Cl.
*F04D 29/44* (2006.01)
*F23D 14/62* (2006.01)
(Continued)

(52) U.S. Cl.
CPC ............. *F23D 14/62* (2013.01); *F23D 14/36* (2013.01); *F23L 5/02* (2013.01); *F23K 2900/05002* (2013.01)

(58) Field of Classification Search
CPC .. F23D 14/36; F23D 14/62; F23L 5/02; F04D 17/105; F04D 29/403; F04D 29/4226; F04D 29/4213; F05D 2250/312
See application file for complete search history.

(56) References Cited

U.S. PATENT DOCUMENTS 5,989,014 A * 11/1999 Invernizzi ............... F23D 14/62
431/328

FOREIGN PATENT DOCUMENTS

DE 29803416 U1 5/1998
EP 2278224 A2 1/2011
(Continued)

*Primary Examiner* — Gregory Anderson
*Assistant Examiner* — Jason Fountain
(74) *Attorney, Agent, or Firm* — Volpe and Koenig, P.C.

(57) ABSTRACT

A mixer device for burner equipment includes flow guide means for guiding an air-gas mixture to the intake of a fan rotatable about a first axis, the guide means including a tubular Venturi effect conduit structure with axially symmetric contiguous converging and diverging portions about a second axis, a section being provided between the portions of conduit into which the gas flow is delivered for mixing with the air flow supplied through the converging portion. The fan's axis of rotation does not coincide with the axis of longitudinal development of the Venturi effect conduit, the offset between the first and second axes allows placement of a valve which supplies the gas flow into the Venturi effect conduit with a configuration in which the projection of the overall dimensions of the Venturi effect conduit and of the valve unit, in the rotational axis direction, lies within the fan's cover plate projection.

23 Claims, 7 Drawing Sheets

(51) Int. Cl.
*F23D 14/36* (2006.01)
*F23L 5/02* (2006.01)

(56) References Cited

FOREIGN PATENT DOCUMENTS

| EP | 2597369 A1 | 5/2013 |
|----|-----------|--------|
| FR | 2794521 A1 | 12/2000 |
| WO | 2012006166 A2 | 1/2012 |

* cited by examiner

AIR-GAS MIXER DEVICE FOR PREMIX BURNER EQUIPMENT

TECHNICAL FIELD

The present invention relates to an air-gas mixer device for premix gas burner equipment, having the characteristics stated in the preamble to claim 1, which is the principal claim.

TECHNOLOGICAL BACKGROUND

The invention relates, in particular, to the field of gas burner equipment for premix boilers, in which an air-gas fuel mixture is premixed upstream of the combustion head of the burner.

In applications of the aforesaid type, the premixing of air and gas is carried out by means of Venturi effect tubular conduits, in which the gas is supplied through a valve unit to the constricted section of the Venturi conduit, in accordance with the pressure drop signal generated by the air flow. The premixing is also typically carried out upstream of a fan unit designed so that, in delivery mode, it supplies the premixed air-gas flow to the burner.

In the applications described above it is apparent that each operating configuration of the whole burner equipment assembly requires the main components of the system, that is to say the Venturi effect tubular mixer, the fan and the valve unit, to be interfaced with one another according to the existing constraints of the installation, or as a function of the space and overall dimensions determined by the specific boiler layout. This results in a proliferation of configurations that can be provided using conventional components, frequently with large overall dimensions, so that the positioning of the components relative to one another has to be custom-designed for each installation according to the available useful space, as a result of which the provision of each specific boiler layout is usually more costly and time-consuming.

In view of this prior art, there is a perceived need to develop a rational integration of the aforesaid components, so that the system for interfacing these components has a greater, and improved, capacity to conform to the configurations that are feasible in the layout of existing boilers and those under development, with the aim of being able to provide interfaces among the components with smaller overall dimensions and high efficiency in terms of the cost and time required for the provision of a specific boiler layout, while offering a modular structure and a substantial increase in the degree of freedom for the development of the system architecture, in accordance with the existing constraints of the installation and the available space.

DESCRIPTION OF THE INVENTION

The principal object of the invention is to provide an air-gas mixer device having a system for interfacing with the other components which is structurally and functionally designed to overcome the aforesaid limits encountered in the cited prior art.

This and other objects, which will be more apparent from the following text, are achieved by the invention by means of a device of the aforesaid type made in accordance with the appended claims.

Owing to the characteristics of the invention, it is advantageously possible to provide configurations requiring the interfacing of air-gas mixers with valve units and fans in which, for example, the change from one configuration to another can be made simply by rotating the aforesaid components about their axes of symmetry according to the rules for accessibility and/or interfacing. Each configuration can also advantageously be provided in a highly compact way, particularly with the use of a minimum of space, and the configurations can be interchanged by movements relative to one another, and without modifications or changes other than in respect of the established interfaces. Furthermore, the capacity of an integration system of this type is improved as a result of the invention, since all the possible configurations can be achieved while maintaining the functional characteristics required by specific applications.

BRIEF DESCRIPTION OF THE DRAWINGS

The features and advantages of the invention will be more apparent from the following detailed description of some preferred examples of embodiment thereof, illustrated, for the purposes of guidance and in a non-limiting way, with reference to the appended drawings, in which.

PREFERRED EMBODIMENTS OF THE INVENTION

Figure 1:
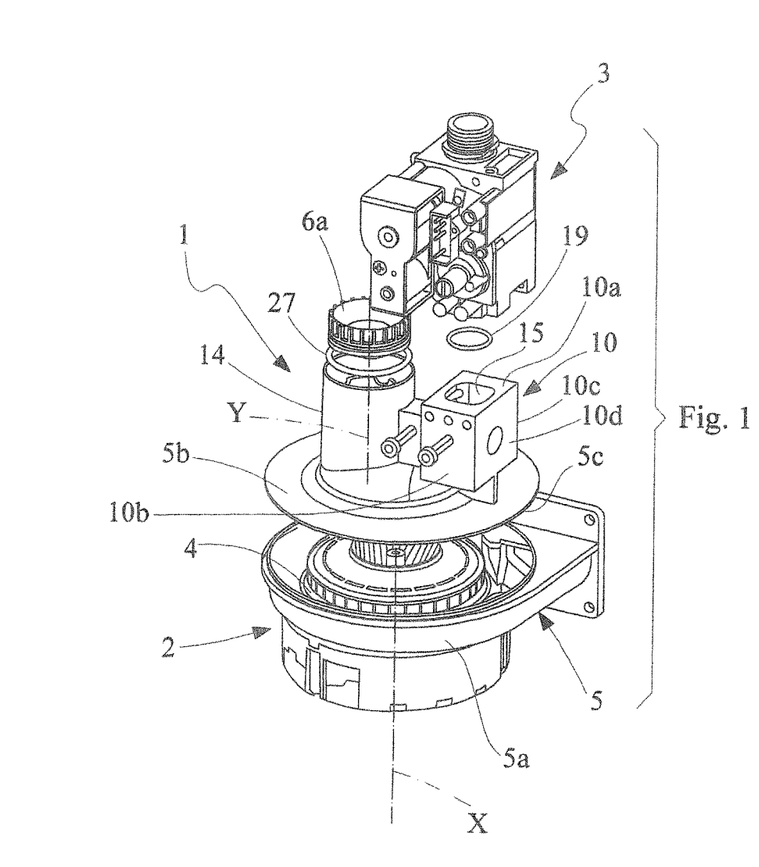
FIG. 1 is an exploded perspective view of an air-gas mixer device according to the invention, shown interfaced with a fan and a valve unit for supplying gas to the device.
Figure 2:
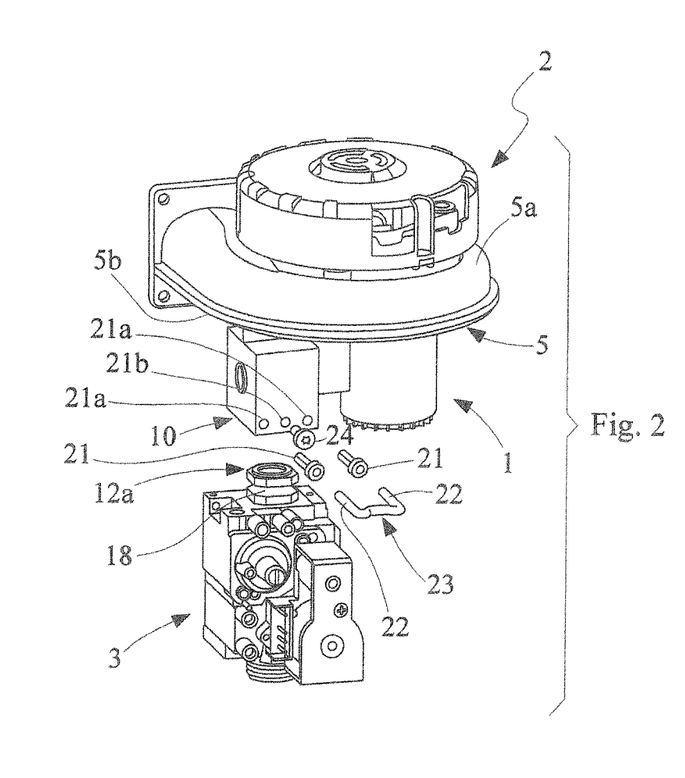
FIG. 2 is a further exploded perspective view of the assembly of FIG. 1, FIGS. 3 and 4 are perspective views of the device of the preceding figures, shown in two different operating configurations of interfacing with the components of the assembly connected to it.
Figure 3:
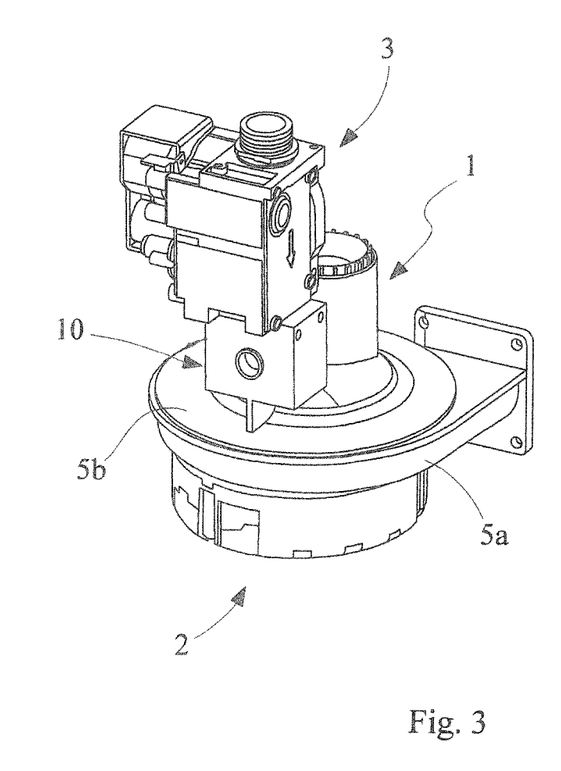
Figure 4:
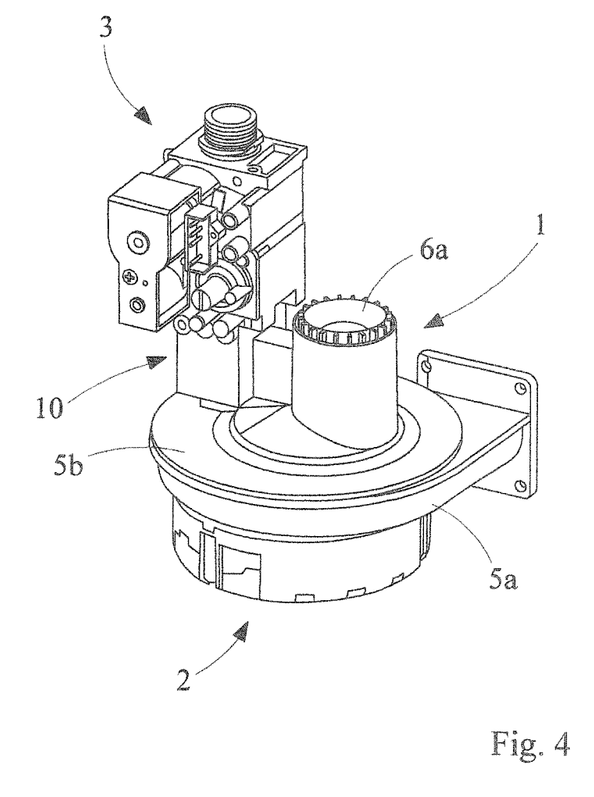

With reference to FIG. 1 initially, the number 1 indicates an air-gas mixer, designed particularly for burner equipment using gas fuel with premixing, made according to the present invention.

The device 1 is designed to receive the air and gas flows introduced into the device, and to mix these flows to form an air-gas fuel mixture to be sent to the intake section 2a of a centrifugal fan 2, which in turn is designed to supply the air-gas fuel mixture, in delivery mode, to the head of a gas burner which is not shown. The invention is particularly, but not exclusively, applicable to the premixing of air and gas for burners of condensing boilers. The number 3 indicates the whole of a valve unit through which the gas flow is supplied to the mixing area of the mixer device 1.

More specifically, the mixer device comprises flow guide means for guiding the air flow into a mixing area into which the gas fuel flow is injected, and for guiding the fuel mixture to the intake section of the fan 3. The fan comprises an impeller 4 driven in rotation about an axis indicated by X. The impeller 4 is housed in a scroll manifold 5 including a housing 5a for receiving the impeller 4 and a cover plate 5b to close the housing, this cover plate being connectable to the housing in the direction of the axis X. A central aperture 7 is formed in the cover plate 5b for communication with the intake section 2a of the fan.

The flow guide means of the device 1 comprise a Venturi effect tubular conduit 6, with respective converging 6a and diverging 6b portions of conduit which are contiguous to one another and extend so as to prolong one another with an axially symmetrical development about the direction of an axis Y. An aperture 8, through which gas is injected into the mixing area of the Venturi conduit, extends across the converging and diverging portions 6a, 6b of the Venturi conduit. As is known, this intermediate area with a constricted cross section is the area in which the air flow passing through the Venturi conduit has a higher speed and a lower pressure, and the pressure drop signal that is generated serves to control the valve unit 3 in a correlated way to deliver a suitable flow of gas to the mixing area.

According to a principal characteristic of the invention, the axis of rotation X of the fan 2 does not coincide with the axis Y of axial development of the Venturi conduit 6 of the mixer, this non-coincidence possibly relating to the position of the axes, the direction of the axes, or both the position and the direction, in such a way that the conduit 6 is offset with a predetermined degree of eccentricity from the manifold 5 of the fan with which it is associated.

The offset between the axes X and Y, which are preferably parallel to each other, is chosen so as to allow the mounting on the mixer device 1 of the valve unit 3 with a configuration in which the projection of the overall dimensions of the Venturi effect conduit 6 and of the valve unit 3, is substantially, and mainly, contained in the projection of the cover plate 5b of the fan, these projections being constructed along the axial direction (X). A configuration of this kind is clearly shown in FIGS. 13-15, in which, owing to the eccentricity of the mixer 1 relative to the fan 2, the overall dimensions of the mixer device together with the valve unit 3 are contained within the spatial volume occupied by the fan in the direction of the axis X (and of the axis Y where it is parallel to this axis), thus achieving a high degree of compactness for the whole assembly formed by the mixer, fan and valve unit.

Figure 13:
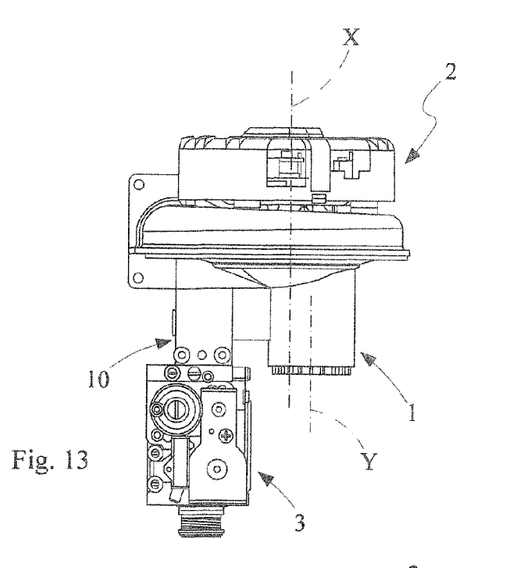
Figure 14:
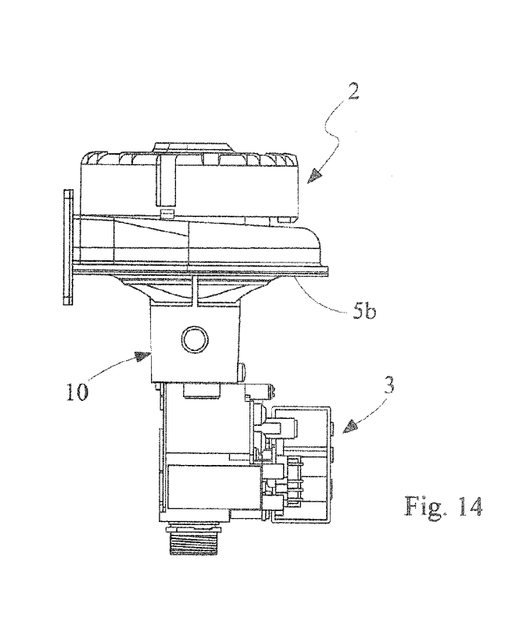
Figure 15:
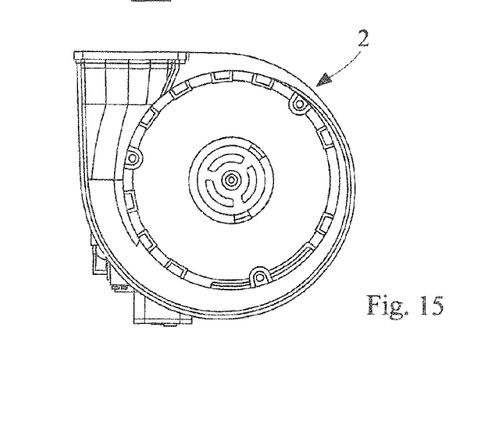
FIG. 15 is a plan view of the assembly of FIGS. 13 and 14.

In the aforesaid figures, the distance between the axes X and Y, which is a measure of the eccentricity of the mixer 1 relative to the fan 2, is indicated by D.

Returning to the mixer device 1, in the examples described above, the structure of the tubular Venturi effect conduit 6, at least as regards the diverging portion 6b of the conduit, is conveniently made integral with, that is to say made in one piece with, the cover plate 5b that closes the fan manifold 5.

The tubular conduit 6 is prolonged, downstream of the diverging portion 6b of the conduit, with respect to the direction of flow, into a bell-shaped portion 9 having no axial symmetry about the second axis Y, adapted to connect the diverging portion 6b to the cover plate 5b of the manifold, at the aperture 7 that puts the diverging portion of the Venturi conduit into communication with the intake section 2a of the fan.

The cover plate 5b for closing the fan manifold 5 has a perimetric profile 5c of regular polygonal or circular shape (the latter of which is shown in the figures), which is concentric with the axis X of the impeller, so as to allow a plurality of possible relative coupling positions between the cover plate 5b and the housing 5a of the fan manifold, so that, in each of these positions, it is possible to provide a respective different orientation of the mixer device 1, and of the valve unit 3 integral therewith, relative to the fan.

Additionally, screw fastening means and counter-means (not shown) are provided between the cover plate 5b and the housing 5a of the fan manifold 5, with a regular angular arrangement of the fastening holes formed in one and/or the other of the housing 5a and cover plate 5b, so as to allow relative fastening in each of the coupling positions of the plurality of possible positions. This feature advantageously makes it possible to increase the number of degrees of freedom of the relative positioning between the mixer and the fan, in accordance with the requirements or the constraints of the installation, and according to the space available for each specific application.

The mixer device 1 is also provided with a block 10 for attaching the valve unit 3 to the device, the block being preferably integral with, that is to say made in one piece with, both the cover plate 5b of the fan and the structure of the Venturi conduit 6, at least as regards the diverging portion 6b of the latter.

A conduit 11 is formed in the block 10, extending between a first end 11a, communicating with the aperture 8 in the Venturi conduit, and an opposed second end 11b intended to be put into communication with a gas delivery aperture 12 provided in the valve unit 3.

It should be noted that the offset D between the axes X and Y is chosen so that the structure of the Venturi effect conduit 6 and the attachment block 10 for the valve unit 3 have overall dimensions whose projection in the direction of the axis X is included within the corresponding projection of the cover plate 5b along the same axial direction X. This feature is, for example, clearly shown in FIGS. 5 to 7.

The end 11a of the conduit 11 opens into an annular chamber 13 delimited between the outer shells of the converging and diverging portions 6a, 6b and the inner wall of a cylindrical tubular portion 14 formed outside said portions and coaxial with them. The chamber 13 also communicates with the aperture 8 for injecting the gas into the Venturi conduit, as described in greater detail below.

A seat 15 is formed in the block 10 to engage, with a sealed connection, with a tubular delivery section 12a provided on the valve unit 3 at the gas delivery aperture 12. The seat 15 is formed in a cavity of the block extending between a mouth 15a of the seat and an opposed base 15b into which the end 11b of the conduit 11 opens.

Figure 5:
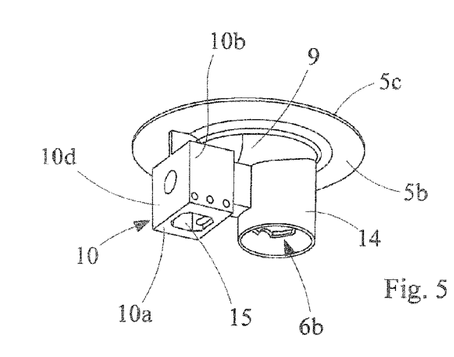
FIG. 5 is a perspective view of a detail of the device of the preceding figures.
Figures 6, 7:
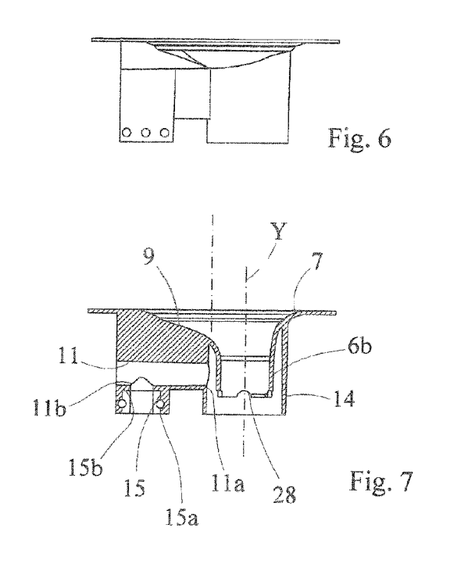
FIGS. 6 and 7 are views, in side elevation and in longitudinal section respectively, of the detail of FIG. 5, FIGS. 8 and 9 are views corresponding to that of FIG. 5, in two different variant embodiments of the detail shown in FIG. 5.
Figure 8:
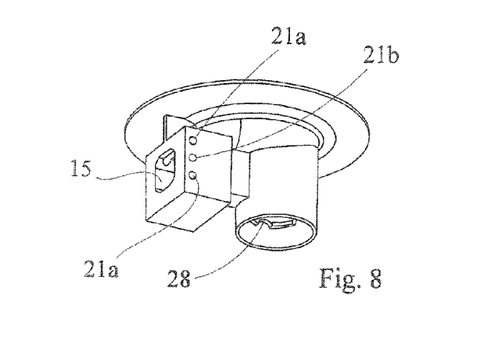
Figure 9:
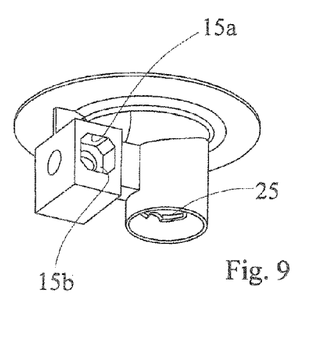
Figure 10:
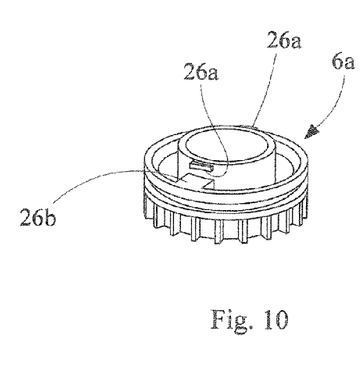
FIG. 10 is an enlarged perspective view of a further detail of the device according to the invention.
Figure 11:
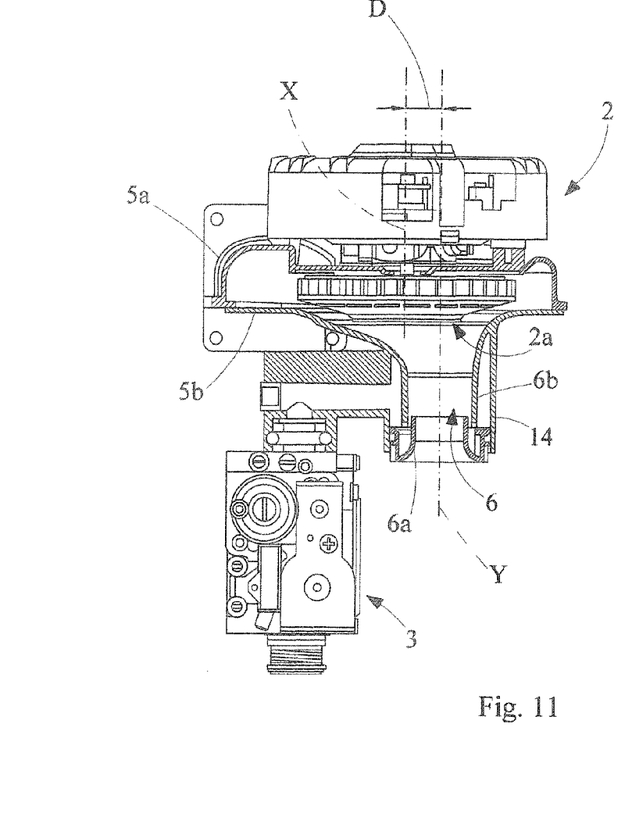
FIG. 11 is a view in axial section of the mixer device of the invention shown interfaced with the fan and the valve unit.
Figure 12:
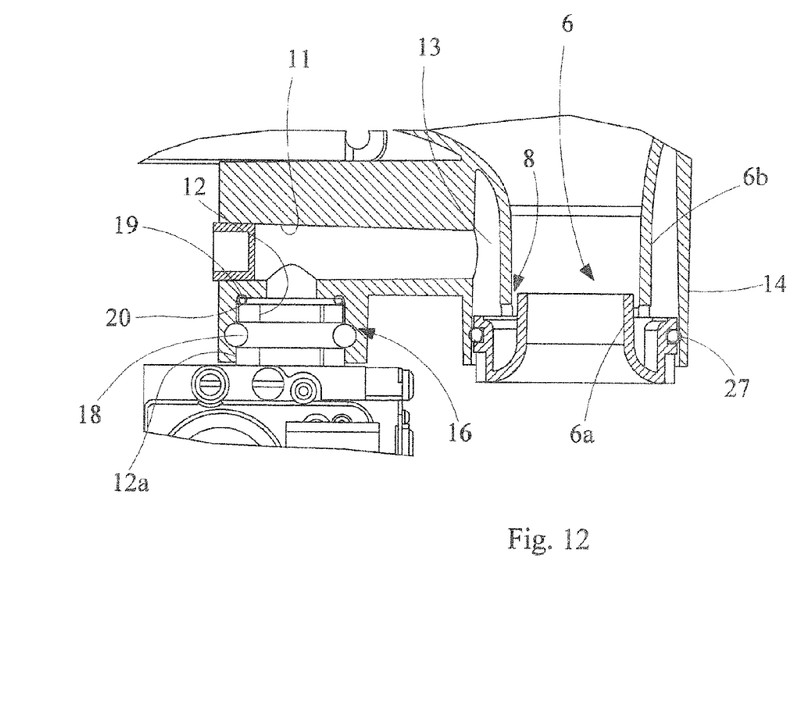
FIG. 12 is a partial sectional view on an enlarged scale of a detail of the device of FIG. 11, FIGS. 13 and 14 are views in side elevation of the device of the invention in a configuration of interfacing with a fan and a valve unit.

The perimetric contour of the cross section of the seat 15 has a polygonal profile, preferably square (with rounded corners), as shown in FIGS. 5, 8 and 9, which is capable of engaging, so as to substantially provide a positive coupling between the profiles, with a respective and corresponding polygonal profile, particularly a square profile, provided on the tubular section 12a of the valve unit 3, the relative coupling between the respective profiles forming means for preventing the rotation of the valve unit 3 relative to the attachment block 10 about the axial direction of insertion and extraction of the valve unit relative to the seat 15.

The block 10 also has a parallelepipedal shape, in which the seat 15 for the attachment of the valve unit can be formed on at least one of at least four possible faces of the block, indicated by 10a-10d, these faces being adjacent to one another, so as to provide four respective and different alternative positions of access to the block for the attachment of the valve unit to the mixer device, and, integrally with this device, to the fan. It should also be noted that, for each of these accesses, formed on one of the faces 10a-10d of the block, the provision of the square profile of the seat 15 allows four possible alternative orientations of the valve with respect to the block, this feature substantially increasing the number of degrees of freedom available to the valve unit 3 for its attachment to the mixer device 1.

The number 16 indicates the whole of gas-tight locking means provided between the valve unit 3 and the seat 15 of the attachment block 10, which are adapted to provide a gas-tight connection of the valve to the device, the gas-tight locking means also operating independently of the rotation prevention means formed by the polygonal profile of the seat 15.

These gas-tight locking means comprise a transverse groove 18 provided in the outer shell of the tubular section 12a of the valve unit 3 designed for axial fitting into the attachment seat 15 of the block 10, and at least one retaining means held axially with respect to the seat 15 and extending, in part at least, in the seat 15 with an arrangement such that it engages the groove 18 when the tubular section 12a of the valve unit is received in the seat 15, so as to lock the attachment block 10 and the valve unit 3 together axially.

A sealing ring 19 of the O-ring type is interposed between the tubular section 12a of the valve unit and the base 15b of the seat 15 to ensure gas-tightness between the coupled parts.

The sealing ring 19 is housed, at least partially, in a cavity 20 at the free end of the tubular section 12a of the valve unit, the sealing ring being compressible both in the axial direction of fitting into the seat 15 and in the radial direction, as a result of the action by which the valve unit is axially locked in the seat.

The axial retaining means is also removably engageable in the seat. In a first exemplary embodiment, the retaining means comprises a pair cylindrical screws 21 capable of engaging, through respective holes 21a provided in the block 10, the seat 15 transversely to the direction of axial fitting and on diametrically opposite sides of the groove 18, so as to secure the action of axial retention of the valve unit with respect to the attachment block.

In a second exemplary embodiment, the retaining means is formed by a pair of opposing branches 22, in the form of cylindrical pins, of a resilient fork-shaped clip 23.

As a further alternative, the axial retaining means comprises at least one locking screw 24 engaged by screwing in a threaded hole 21b passing through the block 10 transversely to the direction of axial fitting into the attachment seat 15, the end of the screw 24 being capable of butting against the base of the groove 18 of the tubular section 12a of the valve unit (when this is received in the seat), in order to secure its relative locking.

It should be noted that the compressive action on the sealing ring 19 is exerted by the tubular section 12a as a result of the engagement of the retaining means in the groove 18.

Returning to the structure of the mixer device 1, the converging portion 6a of the Venturi effect conduit 6 is made structurally independent of the diverging portion 6b and can be fastened to the conduit structure 6 in a removable way. A bayonet coupling between the portions 6a and 6b is conveniently provided to form this removable connection.

In greater detail, the free section of the diverging portion 6b, facing the converging portion, has at least a pair of projections 25, diametrically opposed and projecting radially inside the portion 6b, which are capable of engaging, by a bayonet coupling system, in respective axial retention seats 26 formed on the corresponding free end of the converging portion 6a facing the converging portion. Each projection 25 is retained axially between a respective pair of stop surfaces 26a, 26b, facing each other in the corresponding seat 26 so as to provide axial retention, in the direction of the axis Y, while allowing free relative sliding in a tangential direction, according to the bayonet coupling system.

The converging portion 6a can be fitted axially into the cylindrical tubular portion 14 and is provided with a sealing ring 27 acting on the inner side wall of the cylindrical portion 14 to make the annular chamber 13 gas-tight towards the outside, once the converging portion 6a has been fitted by coupling to the diverging portion 6b.

It should be noted that the end section of the converging portion 6a extends for a certain distance into the end section of the diverging portion 6b, this section of the converging portion having a smaller diameter than the diverging portion, such that an annular section is formed between these portions, creating the aperture 8 for the delivery of the gas flow into the mixing area inside the Venturi conduit.

Because of the configuration as described, the gas flow delivered through the aperture 8 flows into the area of mixing with the air in a direction having a predominantly axial component running parallel to the axis Y of the Venturi conduit.

The number 28 indicates recesses formed on the free end of the diverging portion 6b and open on the free end of this portion, these recesses being adapted to define the passage cross section of the gas flowing from the annular chamber 13 to the aperture 8 for delivering the gas into the Venturi conduit.

According to the invention, the converging portion 6a of the Venturi conduit is also designed to be structurally independent of the diverging portion 6b, so as to be replaceable or interchangeable with other converging portions 6a having different dimensions, in particular as regards the size of the constricted cross section at the end of the converging portion, this size being correlated with the size of the aperture 8 for the passage of the gas into the air-gas mixing area of the Venturi conduit (as the diameter of the converging portion 6a decreases, the size of the aperture 8 increases), in order to enable the mixer device to be calibrated according to specific power ranges required in the burner of the boiler.

Figure 16:
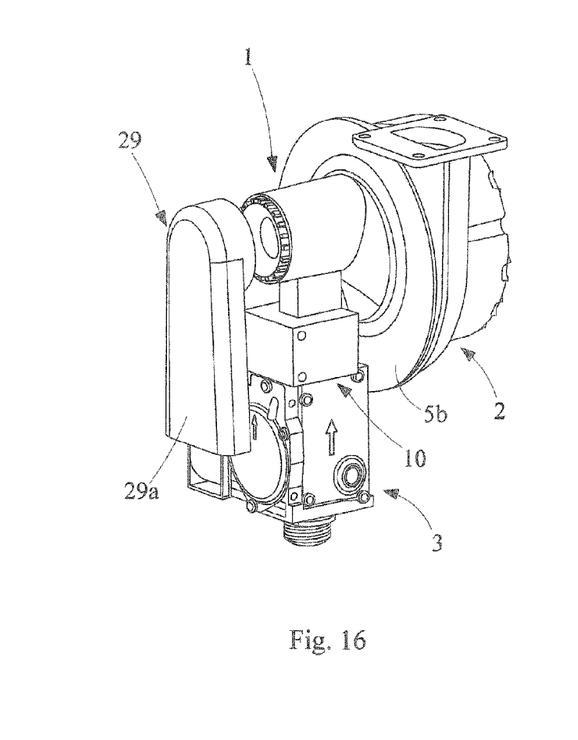
FIG. 16 is a perspective view of the device of the invention in a variant embodiment of a detail of the device.

With particular reference to FIG. 16, a manifold 29 is provided upstream of the converging portion 6a for the air flow sent from outside the mixer device. The manifold 29 has a tubular portion 29a having a predominantly longitudinal extension, open towards the outside at one of its ends and connected at its opposite end to the free end of the tubular portion 14, at the position of the entry of air into the converging portion 6a of the Venturi conduit 6. In the aforesaid connecting area, the manifold 29 is shaped to impart a 90° deflection to the air flow guided in it, at the entry to the Venturi conduit, as clearly shown in FIG. 16. In other words, the manifold 29 is configured to be orientated substantially at a right angle to the axis X of the fan.

Figure 17:
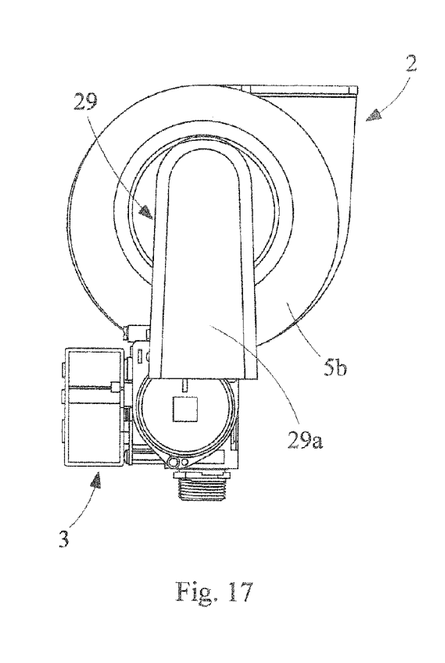
FIG. 17 is a view in side elevation of the device of FIG. 16.
Figure 18:
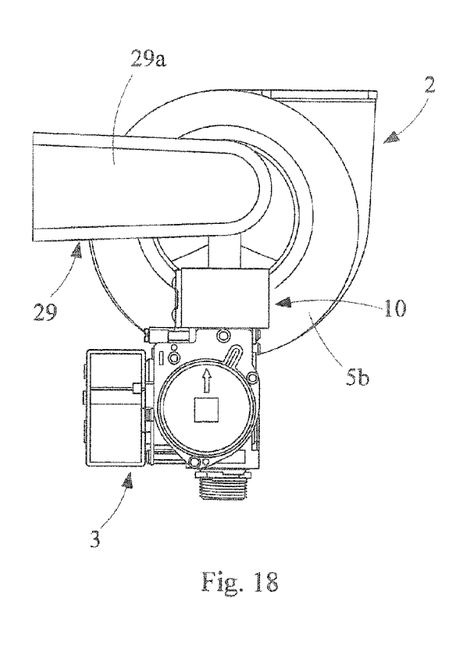
FIG. 18 is a view in side elevation of the device of FIG. 16, in a different configuration.

For the connection of the manifold 29 to the tubular portion 14 of the mixer, a clamp type coupling between cylindrical profiles fitted into one another is conveniently provided. The circular coupling profile also enables the manifold 29 to be orientated with respect to the mixer device 1 in a plurality of relative positions, and preferably in two different configurations, angled at 90° to one another, as shown, respectively, in FIGS. 17 and 18.

Figure 19:
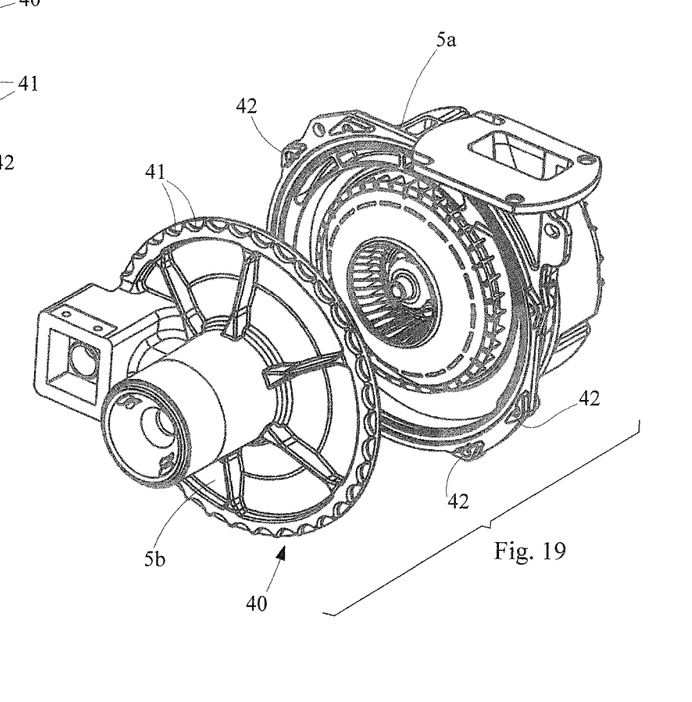
FIG. 19 is a exploded perspective view of the device of the invention in a variant embodiment of a further detail of the device.
Figure 20:
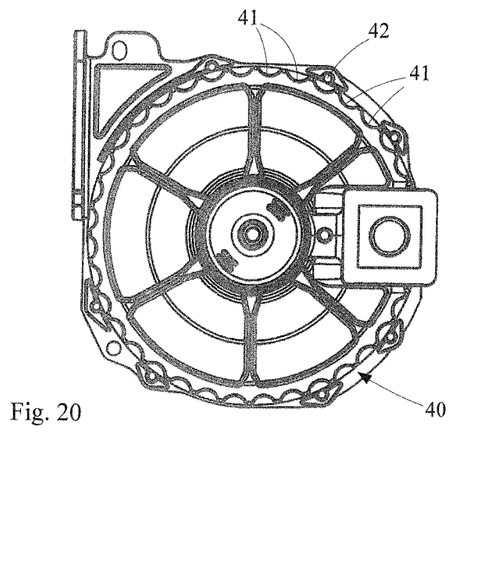
FIGS. 20 and 21 are views in front elevation of the device of the preceding figure, shown in two different operating configurations.
Figure 21:
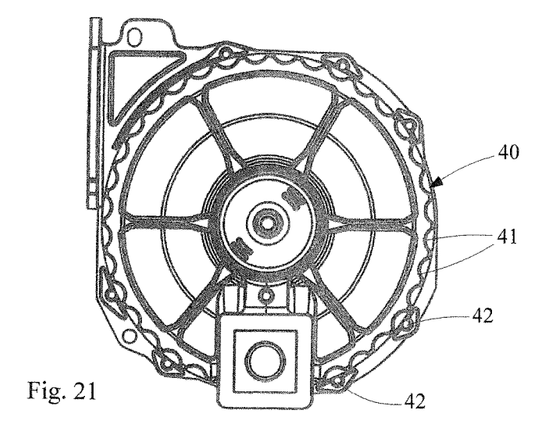

With reference to FIGS. 19-21, in a variant embodiment of the device according to the invention, in which details corresponding to those of the preceding examples are identified by the same reference numerals, the perimetric profile 5c of the cover plate is made with a toothed edge 40.

The toothing of the edge is formed by a plurality of recesses 41, having curved profiles, extending sequentially and contiguously to one another along the profile. A predetermined number of fastening holes 42 are provided on the housing 5a to enable the cover plate to locked to the housing by means of screws. The locking system is such that the head of each screw can be received in a corresponding recess 41 in the edge, in order to fix a predetermined orientation between the cover plate 5b and the housing 5a, the orientation being selected from a plurality of possible relative orientations provided by the toothed edge. Consequently, there is a plurality of possible orientations between the valve unit 3 (connected to the attachment block 10) and the fan 2.

FIGS. 20 and 21 depict, by way of example, two different relative orientations between the cover plate and the housing which can be obtained, from among those made possible by the toothed edge configuration of the profile of the plate.

Thus the invention achieves the proposed objects while yielding the stated advantages by comparison with the known solutions.

Among the advantages, mention should be made, in the first place, of the fact that, because of the provision of a mixer device configuration which is offset with respect to the fan, the space available for attaching the valve unit to the mixer device is increased, while the assembly of the components of the system has an improved capacity to match the possible configurations found in boiler layouts, determined by the available space and overall dimensions.

The invention also makes it possible to increase substantially the relative positions and orientations between the components of the system, that is to say between the mixer, the fan and the valve unit, by increasing the capacity for mutual interfacing of these components, while preserving their functional characteristics.

Another advantage is due to the fact that the increased capacity of the mixer device for interfacing with the other components is achieved in combination with a simplification of the construction of the device, with a consequent reduction in the costs of manufacture.

The invention claimed is:

1. An air-gas mixer device, for premix burner equipment of boilers, comprising:
    flow guide means for guiding an air-gas mixture to an intake section (2a) of a centrifugal fan (2) with an impeller (4) driven in rotation about a first axis (X), the guide means including a tubular Venturi effect conduit structure (6) with contiguous converging and diverging portions (6a, 6b) developed in an axially symmetric manner about a second axis (Y), a section being provided between the portions of conduit into which section a gas flow is delivered for mixing with an air flow supplied through the converging portion (6a) of the conduit,
    the conduit (6) being in communication with the intake section (2a) of the fan, downstream of the diverging portion (6b) with respect to the direction of the vas and air flows,
    the impeller (4) of the fan being housed in a scroll manifold (5) including a housing (5a) for receiving the impeller (4) and a cover plate (5b) to close the housing (5a), a through aperture (7) being formed in the cover plate (5b) to put the Venturi effect conduit (6) into communication with the intake section (2a) of the fan,
    wherein the first axis (X) of rotation of the fan (2) does not coincide with the second axis (Y) of longitudinal development of the Venturi effect conduit (6), an offset between the first and second axes (X, Y) being chosen so as to allow the mixer device to have a valve unit (3) mounted thereon for supplying the gas flow into the Venturi effect conduit (6) with a configuration in which a projection of the overall dimensions of the Venturi effect conduit (6) and of the valve unit (3), in the direction of the axis of rotation (X), lies substantially and predominantly within a projection of the cover plate (5b) of the fan in the direction of the first axis (X).

2. The device according to claim 1, wherein the first axis (X) of rotation of the fan (2) and the second axis (Y) of longitudinal development of the Venturi effect conduit structure (6) are parallel to each other, a distance between the first and second axes (X, Y) defining an offset (D) of the Venturi effect conduit from the intake section (2a) of the fan.

3. The device according to claim 1, wherein the structure of the tubular Venturi effect conduit (6), at least as regards the diverging portion (6b) of the conduit, is integral with the cover plate (5b) that closes the fan manifold (5).

4. The device according to claim 1, comprising a block (10) for the attachment of the valve unit (3) to the device, a conduit (11) being formed in the block (10) and extending between a first end (11a) in communication with the Venturi effect conduit (6) and an opposing second end (11b) designed to be put into communication with an aperture (12) for delivering gas from the valve unit (3), the offset (D) between the first and second axes (X, Y) being chosen so that the Venturi effect conduit structure (6) and the block (10) for attaching the valve unit (3) have total overall dimensions whose projection, at least in the direction of the first axis (X) of rotation, lies within the corresponding projection of the cover plate (5b) of the fan (2) constructed in the same direction as the first axis (X).

5. The device according to claim 4, wherein the attachment block (10) is integral with the Venturi effect conduit structure (6) and with the cover plate (5b) of the fan.

6. The device according to claim 4, wherein the block (10) comprises a seat (15) for engaging and forming a sealed connection with a tubular delivery section (12a) provided on the valve unit, the seat (15) being formed in a cavity of the block (10) extending between a mouth (15a) of the seat and a base (15b) into which an auxiliary conduit (11) for communication with the Venturi effect conduit (6) opens, the perimetric contour of the cross section of the seat (15) having a polygonal profile capable of engaging, so as to substantially provide a positive coupling, with a respective and corresponding polygonal profile created on the tubular delivery section (12a) of the valve unit, the relative coupling between these profiles forming means for preventing the rotation of the valve unit (3) with respect to the attachment block (10) about the axial direction of insertion and extraction of the valve unit relative to the seat.

7. The device according to claim 6, wherein the polygonal profile is square.

8. The device according to claim 6, wherein the attachment block (10) has a parallelepipedal shape and the seat (15) for engaging and forming a sealed connection with the valve unit is provided on one of at least four possible mutually adjacent faces (10a-d) of the block, so as to allow respective and different orientations of the seat (15), and of the valve unit (3) connected thereto, with respect to the mixer device and to the fan (2) which is integral therewith.

9. The device according to claim 6, wherein sealing locking means (16) are provided between the valve unit (3) and the seat (15) of the attachment block (10), said locking means being independent of the rotation prevention means formed by the polygonal profile of the seat (15).

10. The device according to claim 9, wherein the locking means comprise a transverse groove (18) provided in an outer shell of the tubular section (12a) of the valve unit designed for axial fitting into the attachment seat (15) of the block, and at least one retaining means held axially with respect to the seat and extending, in part at least, in the seat (15) with an arrangement such that the at least one retaining means engages the groove (18) when the tubular section (12a) of the valve unit is received in the seat, so as to lock the attachment block (10) and the valve unit (3) together axially, a sealing means being interposed between the tubular section of the valve unit and the seat to ensure a gas-tight seal between the coupled parts.

11. The device according to claim 10, wherein the sealing means comprises a sealing ring (19), of the O-ring type, housed at least partially in a cavity (20) at the free end of the tubular section (12a) of the valve unit, the sealing ring being compressible both in an axial direction of fitting into the seat (15) and in a radial direction, as a result of the action by which the valve unit is axially locked in the seat.

12. The device according to claim 10, wherein an axial retaining means can be removably engaged in the seat (15).

13. The device according to claim 12, wherein the axial retaining means comprise at least one locking screw (24) engaged by screwing in a threaded hole (21b) passing through the block (10) transversely to the direction of axial fitting into the attachment seat (15), the end of the screw (24) being capable of butting against the outer shell of the tubular section (12a) of the valve unit received in the seat, in order to secure the locking of the valve unit relative to the attachment block.

14. The device according to claim 12, wherein the axial retaining means comprises a pair of retaining elements in the form of cylindrical plugs or screws capable of engaging the seat (15) transversely to the direction of axial fitting and on diametrically opposite sides of the groove (18), so as to secure action of axial retention of the valve unit with respect to the attachment block.

15. The device according to claim 14, wherein a pair of cylindrical plug elements form opposing branches (22) of a resilient fork-shaped clip (23).

16. The device according to claim 1, wherein the tubular Venturi effect conduit structure (6) is prolonged, downstream of the diverging portion (6b) of the conduit, with respect to the direction of flow, into a bell-shaped portion (9) having no axial symmetry about the second axis (Y), adapted to connect the diverging portion (6b) of the conduit to the cover plate (5b) of the fan, an end section of the bell (9) putting the Venturi conduit of the mixer into communication with the intake section (2a) of the fan.

17. The device according to claim 1, wherein the cover plate (5b) for closing the fan manifold (5) has a perimetric profile (5c) of regular polygonal or circular shape, which is concentric with the axis (X) of the impeller, so as to allow a plurality of possible relative coupling positions between the cover plate (5b) and the housing (5a) of the fan manifold, so that, in each of these positions, it is possible to provide a respective orientation of the mixer device, and of the valve unit integral therewith, relative to the fan.

18. The device according to claim 17, wherein the perimetric profile (5c) of the cover plate (5b) is provided with a toothed edge (40) including a predetermined number of recesses (41) extending in sequence contiguously to one another along the profile, fastening holes (42) being provided on the housing (5a) for locking the cover plate (5b) on to the housing (5a) by means of screws, the head of each screw being engageable with a corresponding recess (41) in the edge (40), in order to fix a predetermined orientation between the cover plate (5b) and the housing (5a), the predetermined orientation being selectable from a plurality of possible relative orientations provided by the toothed edge (40).

19. The device according to a claim 1, wherein the converging portion (6a) of the Venturi effect conduit is structurally independent of the diverging portion (6b) of the conduit, the converging portion being capable of being fastened removably to the Venturi effect conduit.

20. The device according to claim 19, wherein the converging and diverging portions (6a, 6b) of the Venturi effect conduit are fastened together by a bayonet coupling.

21. The device according to claim 1, wherein a free end of the converging portion (6a), facing the air-gas mixing area, extends inside the diverging portion (6b) and in a coaxial way, the converging portion having an end cross section with a smaller diameter than that of the diverging portion, such that an annular aperture is formed between the portions, through which the gas flow delivered by the valve unit is guided, with a predominantly axial direction of the flow, parallel to the axial direction of the Venturi conduit.

22. The device according to claim 21, wherein the converging and diverging portions (6a, 6b) of the Venturi effect conduit extend inside a cylindrical tubular portion of the mixer device, an annular chamber (13) being formed between the inner wall of the cylindrical portion and the outer shells of the converging and diverging portions, this chamber communicating, respectively, with the end section of the conduit for delivering gas from the valve unit and the annular aperture for delivering gas into the Venturi conduit.

23. An air-gas mixer device, for premix burner equipment of boilers, comprising:
flow guide means for guiding an air-gas mixture to an intake section (2a) of a centrifugal fan (2) with an impeller (4) driven in rotation about a first axis (X), the guide means including a tubular Venturi effect conduit structure (6) with contiguous converging and diverging portions (6a, 6b) developed in an axially symmetric manner about a second axis (Y), a section being provided between the portions of conduit into which section a gas flow is delivered for mixing with an air flow supplied through the converging portion (6a) of the conduit,
the conduit (6) being in communication with the intake section (2a) of the fan, downstream of the diverging portion (6b) with respect to the direction of the gas and air flows, the impeller (4) of the fan being housed in a scroll manifold (5) including a housing (5*a*) for receiving the impeller (4) and a cover plate (5*b*) to close the housing (5*a*), a through aperture (7) being formed in the cover plate (5*b*) to put the Venturi effect conduit (6) into communication with the intake section (2*a*) of the fan, wherein the first axis (X) of rotation of the fan (2) does not coincide with the second axis (Y) of longitudinal development of the Venturi effect conduit (6), an offset between the first and second axes (X, Y) being chosen so as to allow the mixer device to have a valve unit (3) mounted thereon for supplying the gas flow into the Venturi effect conduit (6) with a configuration in which a projection of the overall dimensions of the Venturi effect conduit (6) and of the valve unit (3), in the direction of the axis of rotation (X), lies substantially and predominantly within a projection of the cover plate (5*b*) of the fan in the direction of the first axis (X) and wherein the first axis (X) of rotation of the fan (2) and the second axis (Y) of longitudinal development of the Venturi effect conduit structure (6) are parallel to each other, a distance between the first and second axes (X, Y) defining an offset (D) of the Venturi effect conduit from the intake section (2*a*) of the fan.

* * * * *

UNITED STATES PATENT AND TRADEMARK OFFICE
CERTIFICATE OF CORRECTION

PATENT NO. : 9,677,761 B2  
APPLICATION NO. : 14/902159  
DATED : June 13, 2017  
INVENTOR(S) : Antonio Ranalli et al.

Page 1 of 1

It is certified that error appears in the above-identified patent and that said Letters Patent is hereby corrected as shown below:

In the Claims

In Claim 1, Column 8, Line 8 after the words "with respect to the direction of the" delete "vas" and insert therefore --gas--.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*